Oct. 17, 1967  J. A. MULLINS  3,347,497
AIRCRAFT
Filed Oct. 20, 1965  3 Sheets-Sheet 2
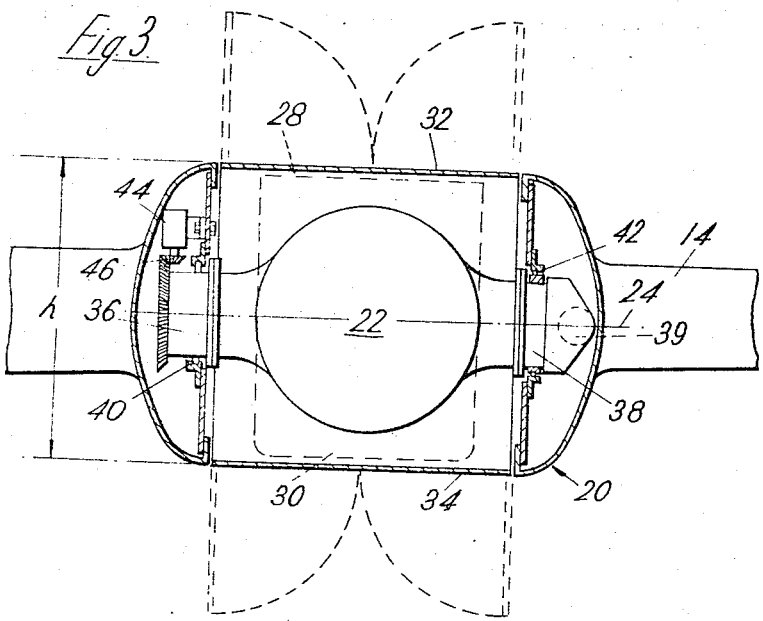
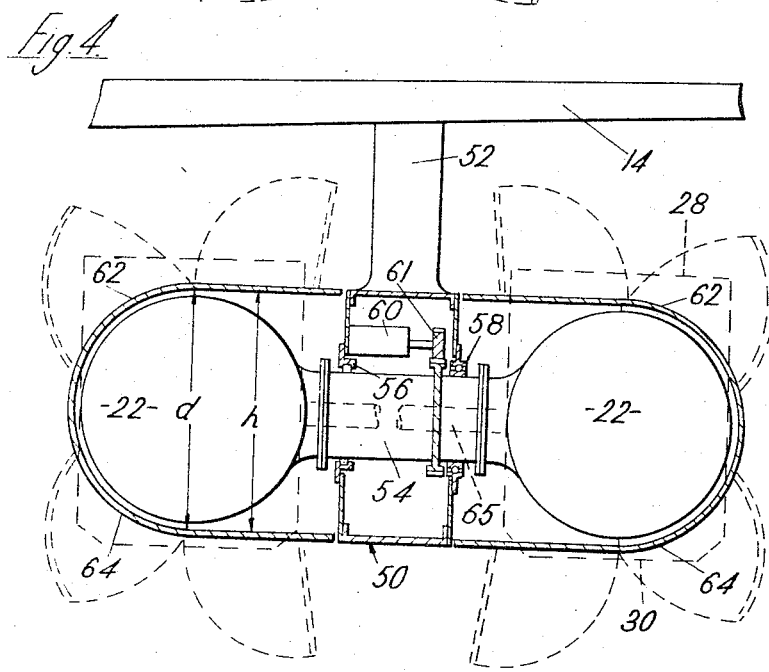
Inventor
John Albert Mullins
By
Cushman, Darby · Cushman
Attorneys

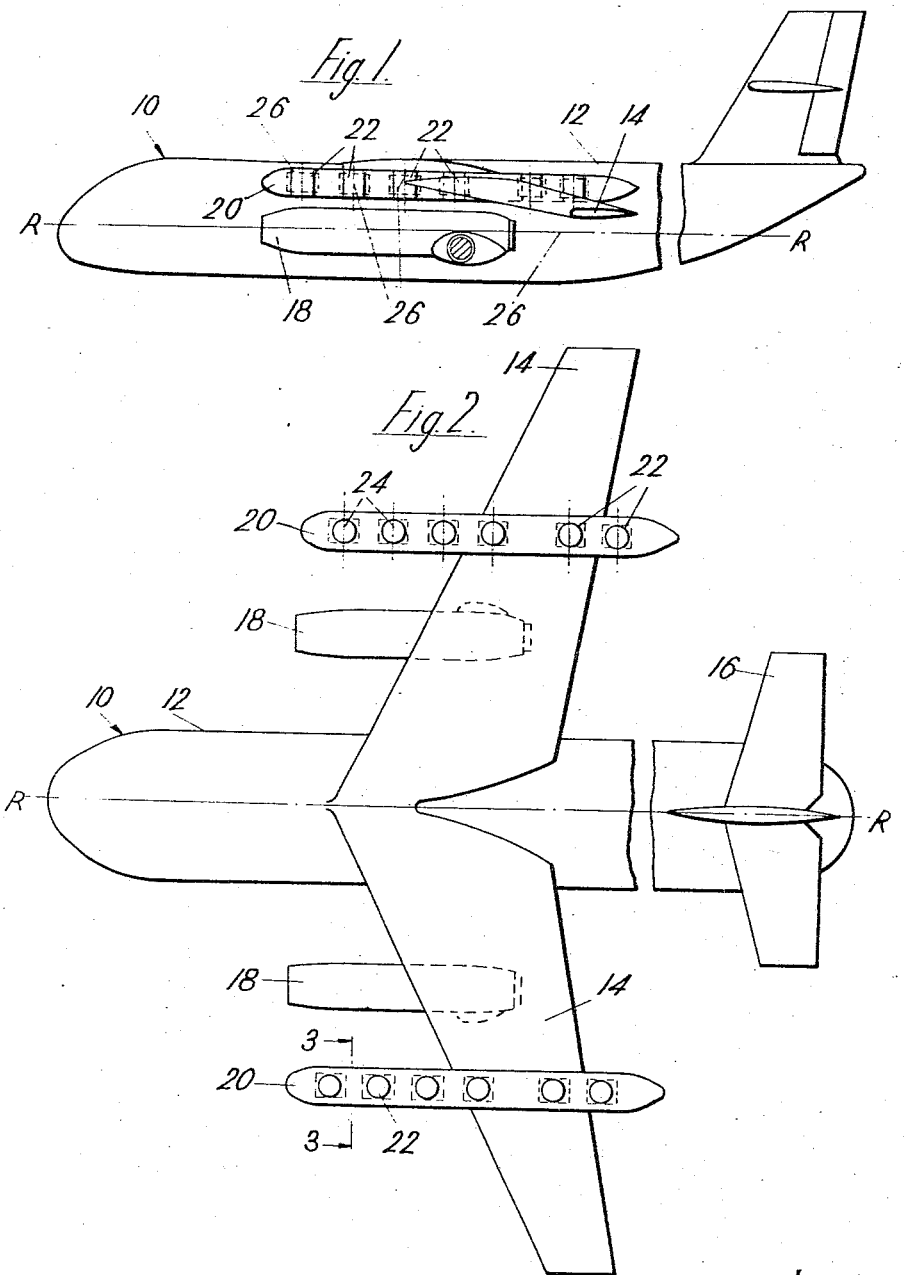

United States Patent Office

3,347,497
Patented Oct. 17, 1967

3,347,497
AIRCRAFT
John Albert Mullins, Derby, England, assignor to Rolls-Royce Limited, Derby, England, a British company
Filed Oct. 20, 1965, Ser. No. 498,589
Claims priority, application Great Britain, Oct. 24, 1964, 43,459/64; Jan. 27, 1965, 3,719/65
10 Claims. (Cl. 244—54)

ABSTRACT OF THE DISCLOSURE

An aircraft power plant including a plurality of gas turbine lift jets mounted in a pod for movement between operative positions in which the engine axes are vertical and inoperative positions in which the engine axes are aligned and horizontal so that the frontal area of the pod is minimized for forward flight.

---

This invention relates to aircraft power plant and aircraft provided therewith, and more particularly to power plant comprising at least one direct lift gas turbine engine, that is, an engine which is adapted to produce lift forces on an aircraft directly and independently of those produced aerodynamically.

Since direct lift engines are not used when the aircraft is in normal forward flight, it is desirable that they be mounted in a power plant in such a way that they present the smallest possible frontal area when not in use, so that drag due to the power plant can be kept as low as possible. The present invention has as an object to provide a power plant construction by which it is possible to meet this requirement.

According to the present invention, there is provided aircraft power plant comprising a pod, at least one direct lift gas turbine engine mounted within the pod, and means for moving said engine relative to the pod between an operative position in which the longitudinal axis of the engine is substantially vertical and an inoperative position in which the longitudinal axis of the engine is horizontal.

The words "vertical" and "horizontal" as used herein will be understood as referring to the vertical and horizontal directions with respect to an aircraft in normal level flight.

Preferably the height of the pod is at least equal to or less than the length of each gas turbine engine. Thus the height of the pod may be substantially equal to the diameter (or maximum diameter) of the or each engine.

According to one preferred arrangement, at least a portion of the outer casing of each engine in its inoperative position forms a part of the pod. Alternatively, the pod may be provided with doors in its upper and lower surfaces, said doors being closed to provide a smooth outer surface to the pod when the or each engine is in its inoperative position and open when the or each engine is in its operative position.

According to a further preferred embodiment, a plurality of engines are arranged in at least one row extending longitudinally of the pod, the engines being so arranged that the ends of adjacent engines in the or each row lie closely adjacent each other in the inoperative positions of the engines. Means may be provided for effecting simultaneous movement of the engines between their operative and inoperative positions.

Means are preferably provided for moving the or each engine in its operative position so as to direct the thrust therefrom forwardly or rearwardly as required. Alternatively, the propulsion nozzle of the or each engine may be adapted to deflect the exhaust gases from the engine in its operative position forwardly or rearwardly as required.

The invention also comprises an aircraft provided with at least one power plant as set forth above. Said aircraft may additionally be provided with at least one jet propulsion engine which is adapted to eject its propulsive jet rearwardly or downwardly as required.

The invention will be described, by way only of example, with reference to the drawings, in which:

FIGURE 1 is a partly cut-away side elevation of an aircraft provided with power plant according to the invention;

FIGURE 2 is a top plan view of the aircraft of FIGURE 1;

FIGURE 3 is a transverse cross section through one of the power plant shown in FIGURES 1 and 2, taken on the line 3—3 of FIGURE 2 and shown on an enlarged scale;

FIGURE 4 is a transverse cross section similar to that of FIGURE 3 of power plant according to an alternative embodiment of the invention;

Figure 5:
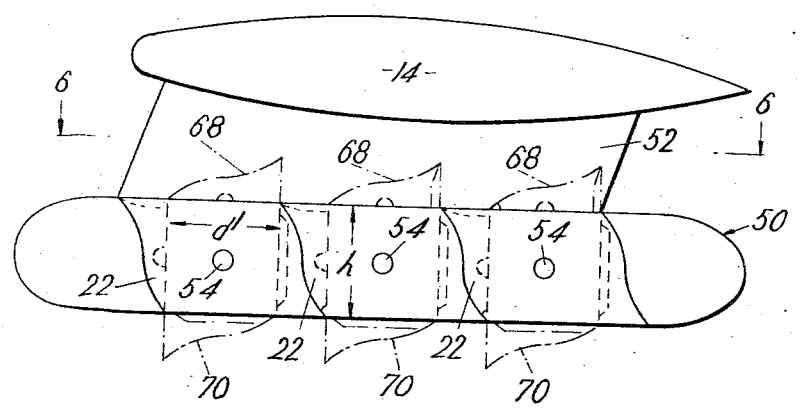
FIGURE 5 is a side elevation of power plant according to a further embodiment of the invention.

Referring to FIGURES 1 and 2, an aircraft 10 has a fuselage 12, wings 14 and a tailplane 16. Each wing 14 supports an underslung podded forward propulsion gas turbine engine 18. Each engine 18 is adapted so that its propulsive jet can be deflected as required downwardly instead of rearwardly so as to produce lift forces on the aircraft independently of the lift forces generated aerodynamically by forward flight of the aircraft 10.

Each wing 14 also supports a pod 20 which extends parallel to the longitudinal axis R—R of the aircraft 10 and which houses six direct lift gas turbine engines 22 in a single longitudinally extending row. Each gas turbine engine 22 is supported, as described below with reference to FIGURES 3 and 4, within its pod 20 so that it can pivot about an axis 24 parallel to the transverse axis of the pod 20 as shown in FIGURE 2. Means (not shown) are provided for simultaneously causing the engines 22 in each pod 20 to pivot about the axes 24 from an operative position (FIGURE 1) in which the longitudinal axis 26 of each engine is disposed substantially vertical to an inoperative position (shown in broken lines) in which the longitudinal axis 26 of each engine 22 is horizontal, and disposed parallel to the longitudinal axis R—R of the aircraft 10. It will be seen that the row of engines 22 in each pod 20 is so arranged that the ends of adjacent engines 22 lie closely adjacent each other in the inpoerative positions of the engines 22.

FIGURE 3 shows a cross section through one of the pods 20 with the engines 22 in their inoperative positions. The broken line shows the outline of an engine 22 in its operative position, the air intake being indicated at 28 and the exhaust nozzle at 30. It will be seen that in this embodiment the overall length of the engines 22 is substantially equal to the height $h$ of the pod 20. The upper and lower surfaces of the pod 20 are preferably provided with respective sets of closure doors 32, 34 which, in their closed positions (solid lines) form part of the smooth outer surface of the pod 20 and in their open positions, illustrated diagrammatically in broken lines, expose the air intakes 28 and exhaust nozzles 30 respectively of the engines 22.

Each engine 22 is swivellably mounted in the pod 20 on a pair of trunnions 36, 38 which are rotatably supported from the pod structure in respective bearings 40, 42. A motor 44 mounted on the pod structure provides a driving torque to the trunnion 36 through bevel gearing 46. The motors 44, which may be electric, hydraulic or of any other convenient type, are energised from a common power source (not shown) so that it may be arranged that the motors 44 operate in unison to move the respective engines 22 simultaneously from their operative to their inoperative positions.

The trunnions 36, 38 are hollow and air bleed or other conduits may communicate with the engine 22 through the hollow interior of one or both of the trunnions, as shown schematically in broken lines at 39.

The motors 44 can be additionally controlled by any convenient means (not shown) under the control of the pilot so that when the engines 22 are in their operative positions they may be tilted about the axes 24 to direct the longitudinal axis 26 of each engine 22 forwardly or rearwardly of the aircraft as required: when directed forwardly, the jet exhaust gases will produce a rearward reaction and the engines 22 will therefore assist the deceleration of the aircraft 10 when landing on a runway; when directed rearwardly, the jet exhaust gases will produce a forward reaction which will assist transition of the aircraft 10 from vertical (or near-vertical) flight to normal horizontal flight after a vertical or short take-off.

An alternative power plant arrangement is shown in FIGURE 4. The direct lift engines 22 are housed in underslung pods 50 which are supported beneath the wings 14 by means of struts 52, FIGURE 4 showing one of the pods 50 in section in a view similar to the view of the pod 20 in FIGURE 3.

Each pod 50 is elongated in a direction parallel to the longitudinal axis R—R of the aircraft 10 and houses two parallel longitudinally extending rows of engines 22, each row being disposed symmetrically about the strut 52. The engines 22 are mounted in pairs arranged transversely of the pod 50, one such pair of engines 22 being shown in FIGURE 4. The two engines 22 of each pair are mounted on a common trunnion 54 which is supported in bearings 56, 58 from the pod structure.

Movement of the engines 22 of each pair between their inoperative positions shown in solid lines and their operative positions shown in broken lines is effected by a common motor 60 secured to the pod structure and adapted to impart drive to the trunnion 54 through spur gearing 61.

As in the embodiment of FIGURE 3, the upper and lower surfaces of the pod 50 are provided with respective closure doors, indicated diagrammatically at 62, 64 respectively for each row of engines 22. The closed positions of the doors 62, 64 are shown in solid lines, while the open positions are indicated by broken lines. Also, as in the embodiment of FIGURE 3, the trunnion 54 is hollow and air bleeds from the engines 22 are taken through a conduit disposed within the trunnion 54 and indicated diagrammatically in broken lines at 65.

It will be seen that in the embodiment of FIGURE 4, the maximum diameter $d$ of each lift engine 22 is almost equal to the height $h$ of the pod. Since the engines 22 have an overall length which is greater than their maximum diameter, it follows that in their operative positions the engines 22 extend a substantial extent above and below the pod 50.

Figure 6:
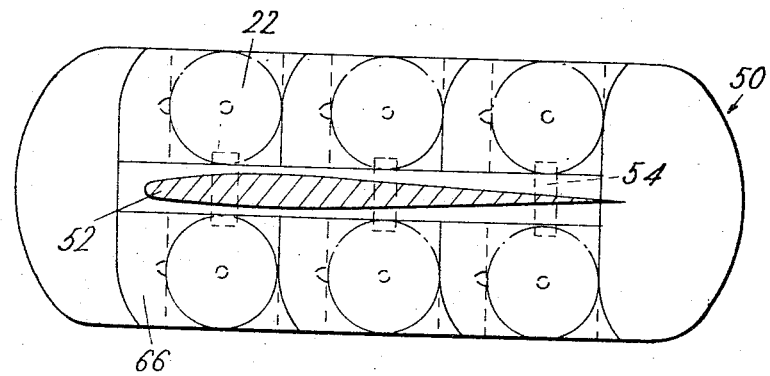
FIGURE 6 is a plan view of the power plant shown in FIGURE 5 viewed from the section line 6—6 of FIGURE 5.

A further embodiment of the power plant according to the invention is shown in FIGURES 5 and 6. The direct lift engines 22 are housed in an underslung wing pod 50 in two rows of three engines. Parts which correspond to those of FIGURE 4 are indicated by the same reference numerals in FIGURES 5 and 6. The engines 22 are arranged in pairs transversely of the pod 50 on respective trunnions 54 in, for example, the manner described above with reference to FIGURE 4, so that they can be moved as required between the inoperative positions shown in solid lines and the operative positions shown in broken lines.

Each engine 22 has a respective outer casing 66 part of which, in the inoperative position of the engine, forms part of the outer surface of the pod 50. The casings 66 have suitably shaped opposite end portions 68, 70 at the intake and exhaust ends respectively of the engines 22 such that, when the engines 22 are in their inoperative positions the end portions 68, 70 of adjacent engine casings 66 abut to form a continuous smooth external pod surface.

In this embodiment, of course, the diameter $d'$ of the engine casing 66 is equal to the height $h$ of the pod 50. The casing end portions 68, 70 extend above and below the pod 50 when the engines 22 are in their operative positions, the rearward part of each end portion 68 being higher than the forward part thereof, and the forward part of each end portion 70 being lower than the rearward part thereof. The end portions 68 thereby act as intake scoops for the engines 22 when the aircraft 10 has a small forward airspeed.

The arrangements described above clearly permit the lift engines 22 to be housed in a pod or nacelle having relatively small frontal area when the engines are not in use.

The engines 22 are designed to have thrust-to-weight ratios of at least 8:1, and preferably of at least 16:1.

I claim:
1. Aircraft power plant comprising a pod, a plurality of direct lift gas turbine engines arranged in at least one row extending longitudinally of the pod, and means for moving said engines relative to the pod between operative positions in which the longitudinal axes of the engines are substantially vertical and inoperative positions in which the longitudinal axes of the engines are horizontal, the engines being so arranged that the engines in said at least one row lie with their longitudinal axes aligned and their ends adjacent each other in the inoperative positions of the engines.

2. Aircraft power plant as claimed in claim 1 wherein the height of the pod is less than the length of each gas turbine engine.

3. Aircraft power plant as claimed in claim 2 wherein the height of the pod is substantially equal to the maximum diameter of each said engine.

4. Aircraft power plant as claimed in claim 3 wherein at least a portion of the outer casing of each engine in its inoperative position forms a part of the outer surface of the said pod.

5. Aircraft power plant as claimed in claim 1 wherein the pod is provided with doors in its upper and lower surfaces, said doors being closed to provide a smooth outer surface to the pod when each engine is in its inoperative position and open when said engine is in its operative position.

6. Aircraft power plant as claimed in claim 1 wherein two said rows of engines are provided in the pod, the engines being mounted in pairs arranged transversely of the pod, and the two engines of each said pair being mounted on a common trunnion for movement together between their operative and inoperative positions.

7. Aircraft power plant comprising: a pod, at least two pairs of direct lift gas turbine engines mounted within the pod, each pair of engines being mounted on a common trunnion extending transversely of the pod's longitudinal axis, means for moving said engines relative to said pod between an operative position in which the longitudinal axes of the engines are substantially vertical and inoperative position in which the longitudinal axes of the engines are horizontal.

8. Aircraft power plant as claimed in claim 1 wherein means are provided for moving each engine in its operative position so as to direct the thrust therefrom selectively forwardly and rearwardly as required.

9. An aircraft provided with at least one power plant according to claim 1.

10. An aircraft as claimed in claim 9 which is additionally provided with at least one jet propulsion engine which is adapted to eject its propulsive jet selectively rearwardly and downwardly as required.

References Cited

UNITED STATES PATENTS

| | | | |
|---|---|---|---|
| 2,403,936 | 7/1946 | Loback | 244—56 X |
| 2,912,188 | 11/1959 | Singelmann et al. | 244—52 X |
| 2,930,544 | 3/1960 | Howell | 244—52 X |
| 2,936,969 | 5/1960 | Griffith et al. | 244—52 |
| 3,033,493 | 5/1962 | Wilde et al. | 244—52 X |
| 3,154,916 | 11/1964 | Eich Holtz | 244—56 X |
| 3,159,363 | 12/1964 | Stewart | 244—52 |
| 3,220,669 | 11/1965 | Lewis et al. | 244—53 X |
| 3,223,354 | 12/1965 | Seibold et al. | 244—52 X |
| 3,259,338 | 7/1966 | Schmidt | 244—52 X |

MILTON BUCHLER, *Primary Examiner.*

B. BELKIN, *Assistant Examiner.*